UNITED STATES PATENT OFFICE.

WILHELM CONNSTEIN, OF BERLIN, AND KARL LÜDECKE, OF WILMERSDORF, NEAR BERLIN, GERMANY.

PROCESS FOR MANUFACTURING OF PROPANTRIOL FROM SUGAR.

1,368,023. Specification of Letters Patent. Patented Feb. 8, 1921.

No Drawing. Application filed August 13, 1919. Serial No. 317,325.

*To all whom it may concern:*

Be it known that we, WILHELM CONNSTEIN, chemist, a citizen of Prussia, and residing at Fasanenstreet 27, Berlin, Germany, and KARL LÜDECKE, a citizen of Prussia and residing at Kaiser Allee 156, Wilmersdorf, near Berlin, Germany, have invented a new and useful Improvement in Processes for Manufacturing of Propantriol from Sugar; and we do hereby declare the following to be a full, clear, and exact description of the same.

In a copending application Serial Number 317,324 filed Aug. 13, 1919, a process for manufacturing propantriol from sugar by fermentation in the presence of alkaline reacting salts has been described. The present process for manufacturing propantriol consists in adding nonalkaline reacting salts *i. e.* neutral or acid reacting salts to sugar and causing the mixture to be fermented above the formation of 3% propantriol from the used sugar and until the disappearance of the sugar. As sugar we may use all sorts of fermentable sugars: saccharose, dextrose, levulose, invert sugar, maltose, molasses, etc.

As salts we may use all soluble salts having no poisonous action on yeast.

Example I.

1000 grams sugars, 900 grams crystallized ferrous-sulfate and the following nutritive salts: 8 grams ammonium sulfate, 7 grams sodium phosphate, 2 grams potassium sulfate, 7 grams magnesium sulfate are dissolved in 10 liters water and 100 grams yeast (commercial press yeast or cultivated pure races) are added. One allows the mixture to stand at about 30–35° centigrade. After 5 days the sugar has disappeared, which may be determined by the known reactions. About 125 grams propantriol, *i. e.* 12.5% from the sugar, has been formed.

For isolating the propantriol one may evaporate the mixture to a degree that the ferrous sulfate may crystallize. The uncrystallized portion of ferrous sulfate is precipitated with lime, one filtrates, acidulates the filtrate with a small surplus of sulfuric acid and evaporates until the formation of a light brown syrup which contains after filtration about 80% propantriol. One may also extract the propantriol from the evaporated syrup by means of alcohol and may decolorize the alcoholic extract by means of decolorizing carbon. After evaporation of the alcohol a yellow syrup is obtained containing about 90–95% propantriol.

The crude propantriol obtained from the fermented liquor by any suitable method known for isolating propantriol may be refined by any known method, for instance by distillation with superheated steam and, if desired by concentrating the distillate.

Example II.

1500 grams sugar, 1200 grams crystallized aluminium sulfate and as nutritive salts: 10 grams ammonium sulfate, 8 grams sodium phosphate, 4 grams potassium sulfate, 10 grams magnesium sulfate are dissolved in 15 liters water and mixed with 150 grams yeast. The further treatment may be carried out according to Example I. One obtains about 200 grams propantriol.

Example III.

1000 grams sugar, 300 grams ammonium chlorid and as nutritive salts: 10 grams ammonium sulfate, 7 grams sodium phosphate, 3 grams potassium sulfate and 8 grams magnesium sulfate are dissolved in 9 liters water and added with 100 grams yeast. After 4 days having stood at 30–35° centigrade the sugar has disappeared. The liquid contains about 75 grams propantriol. The further treatment may be carried out as in Example I.

Example IV.

1000 grams sugar, 400 grams calcium-chlorid free of water and as nutritive salts: 8 grams ammonium sulfate, 5 grams sodium phosphate, 2 grams potassium sulfate are dissolved in 10 liters water. One adds 100 grams yeast and allows to stand at 30–35° centigrade. After 6 days the sugar has disappeared and the solution contains about 85 grams propantriol. One adds to the hot liquid sodium carbonate until further additions do not cause a precipitate. Then one filters from the precipitated calcium carbonate, acidulates the filtrate with hydrochloric acid until a slight acid reaction and evaporates the liquid to syrupy consistency. The obtained magma containing sodium chlorid is extracted with absolute alcohol, the alcoholic liquid treated with decolorizing carbon and the alcohol is evaporated. The remaining light brown syrup contains 80–85% propantriol, which may be recovered by distillation with superheated steam under diminished pressure.

We claim:

A process of obtaining propantriol, comprising mixing sugar-containing solutions with water-soluble salts of non-alkaline reaction in larger amounts than sufficient to form nutrients for yeast, adding yeast, and then allowing the liquid to ferment until the sugar disappears.

In testimony whereof, we have signed our names to this specification in the presence of two subscribing witnesses.

WILHELM CONNSTEIN.
Dr. KARL LÜDECKE.

Witnesses:
JULIUS FRANKE,
ERNA WOLFF.